US008000238B2

(12) United States Patent
Bordonaro et al.

(10) Patent No.: US 8,000,238 B2
(45) Date of Patent: Aug. 16, 2011

(54) SYSTEM AND METHOD FOR DETECTING AND REGULATING CONGESTION IN A COMMUNICATIONS ENVIRONMENT

(75) Inventors: Frank G. Bordonaro, Cary, NC (US); John P. Fussell, Raleigh, NC (US); Bernie P. Pearce, Morrisville, NC (US); Paul A. Schmidt, Cary, NC (US); Uwe Sellentin, Woodside, CA (US)

(73) Assignee: Cisco Technology, Inc., San Jose, CA (US)

( * ) Notice: Subject to any disclaimer, the term of this patent is extended or adjusted under 35 U.S.C. 154(b) by 325 days.

(21) Appl. No.: 11/462,500

(22) Filed: Aug. 4, 2006

(65) Prior Publication Data
US 2008/0031131 A1 Feb. 7, 2008

(51) Int. Cl.
H04L 12/26 (2006.01)
(52) U.S. Cl. .................. 370/231; 370/229; 370/235
(58) Field of Classification Search .............. 370/320, 370/338, 229–240; 709/235
See application file for complete search history.

(56) References Cited

U.S. PATENT DOCUMENTS

| 4,914,650 | A | * | 4/1990 | Sriram ........................ 370/235 |
| 5,894,557 | A | | 4/1999 | Bade et al. ............... 395/200.58 |
| 5,914,934 | A | | 6/1999 | Rathnavelu |
| 6,134,245 | A | | 10/2000 | Scarmalis ..................... 370/474 |
| 6,192,051 | B1 | | 2/2001 | Lipman et al. ................ 370/389 |
| 6,363,065 | B1 | | 3/2002 | Thornton et al. ............. 370/352 |
| 6,400,722 | B1 | | 6/2002 | Chuah et al. .................. 370/401 |
| 6,477,595 | B1 | | 11/2002 | Cohen et al. .................. 710/105 |
| 6,512,754 | B2 | | 1/2003 | Feder et al. ................... 370/338 |
| 6,512,773 | B1 | | 1/2003 | Scott ........................ 370/395.61 |
| 6,535,482 | B1 | * | 3/2003 | Hadi Salim et al. .......... 370/229 |
| 6,771,672 | B1 | | 8/2004 | Ansley et al. |
| 6,901,049 | B1 | | 5/2005 | Chapman |
| 7,068,684 | B1 | * | 6/2006 | Suder et al. ................... 370/493 |
| 2003/0014764 | A1 | | 1/2003 | Saladino et al. |
| 2003/0179720 | A1 | * | 9/2003 | Cuny ........................... 370/310 |
| 2003/0206521 | A1 | * | 11/2003 | Qiao ............................ 370/230 |
| 2003/0206530 | A1 | | 11/2003 | Lindsay et al. |

(Continued)

FOREIGN PATENT DOCUMENTS
WO WO 2007/086996 A2 8/2007
WO WO 2007/086996 A3 8/2007

OTHER PUBLICATIONS

Notification of Transmittal of the International Search Report and the Written Opinion of the International Searching Authority, or the Declaration, International Application No. PCT/US06/44436 (2286), 8 pages, Mailed Sep. 28, 2007.

(Continued)

*Primary Examiner* — Erika A Gary
*Assistant Examiner* — Michael Mapa
(74) *Attorney, Agent, or Firm* — Baker Botts L.L.P.

(57) ABSTRACT

An apparatus for communicating data is provided that includes a cell site element associated with a base transceiver station and operable to receive a plurality of packets associated with a communications flow, the packets including a plurality of subrates. The cell site element is further operable to detect a congestion condition via a measurement of a level in a receive jitter buffer. When the congestion condition exists, individual subrates can be dropped from subsequent backhaul packets until congestion subsides. In more particular embodiments, the cell site element can be informed that congestion exists, whereby a congestion level is assigned to a collection of the subrates. In addition, the cell site element prioritizes the subrates and removes individual samples from one or more of the packets; high priority calls and critical radio control information are not affected during the congestion condition.

20 Claims, 6 Drawing Sheets

U.S. PATENT DOCUMENTS

| | | | | |
|---|---|---|---|---|
| 2004/0052212 | A1* | 3/2004 | Baillargeon | 370/235 |
| 2004/0228326 | A1 | 11/2004 | Pearson | |
| 2005/0041623 | A1* | 2/2005 | Livet et al. | 370/332 |
| 2005/0058146 | A1 | 3/2005 | Liu et al. | |
| 2005/0058149 | A1 | 3/2005 | Howe | |
| 2005/0207437 | A1* | 9/2005 | Spitzer | 370/412 |
| 2005/0281253 | A1 | 12/2005 | Veijalainen et al. | |
| 2005/0286416 | A1 | 12/2005 | Shimonishi et al. | |
| 2006/0215574 | A1 | 9/2006 | Padmanabhan et al. | |
| 2006/0268689 | A1 | 11/2006 | Tarraf et al. | |
| 2007/0133411 | A1* | 6/2007 | Bosch et al. | 370/232 |
| 2007/0159967 | A1 | 7/2007 | Bordonaro et al. | |

OTHER PUBLICATIONS

Bordonaro et al., "System and Method for Addressing Dynamic Congestion Abatement for GSM Suppression/Compression," U.S. Appl. No. 11/469,496, 46 pgs, Filed Sep. 1, 2006.

U.S. Patent and Trademark Office, First Office Action for U.S. Appl. No. 11/469,496, filed Sep. 1, 2006, Frank G. Bordonaro et al., Electronically Mailed Aug. 22, 2008.

U.S. Patent and Trademark Office, Final Office Action for U.S. Appl. No. 11/469,496, filed Sep. 1, 2006, Bordonaro et al., Electronically Mailed Jan. 6, 2009.

U.S. Patent and Trademark Office, Interview Summary for U.S. Appl. No. 11/469,496, filed Sep. 1, 2006, Bordonaro et al., Electronically Mailed Mar. 5, 2009.

PTO Office Action, U.S. Appl. No. 11/469,496, filing dated Sep. 1, 2006, inventor Bordonaro, 25 pages, May 19, 2009.

PTO Office Action, U.S. Appl. No. 11/469,496, filing dated Sep. 1, 2006, inventor Bordonaro, 23 pages, Dec. 10, 2009.

PTO Office Action, U.S. Appl. No. 11/469,496, filing dated Sep. 1, 2006, inventor Bordonaro, 27 pages, Jun. 14, 2010.

* cited by examiner

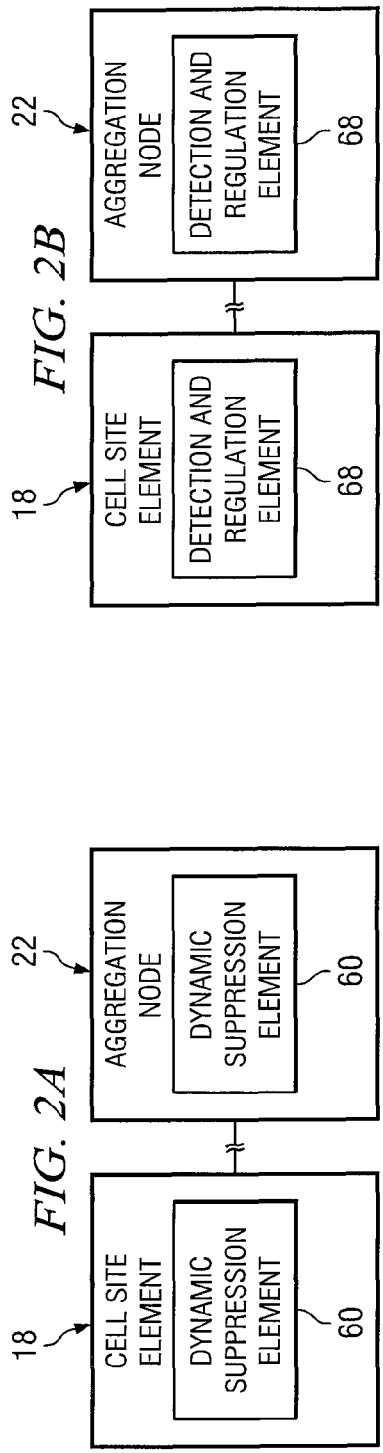
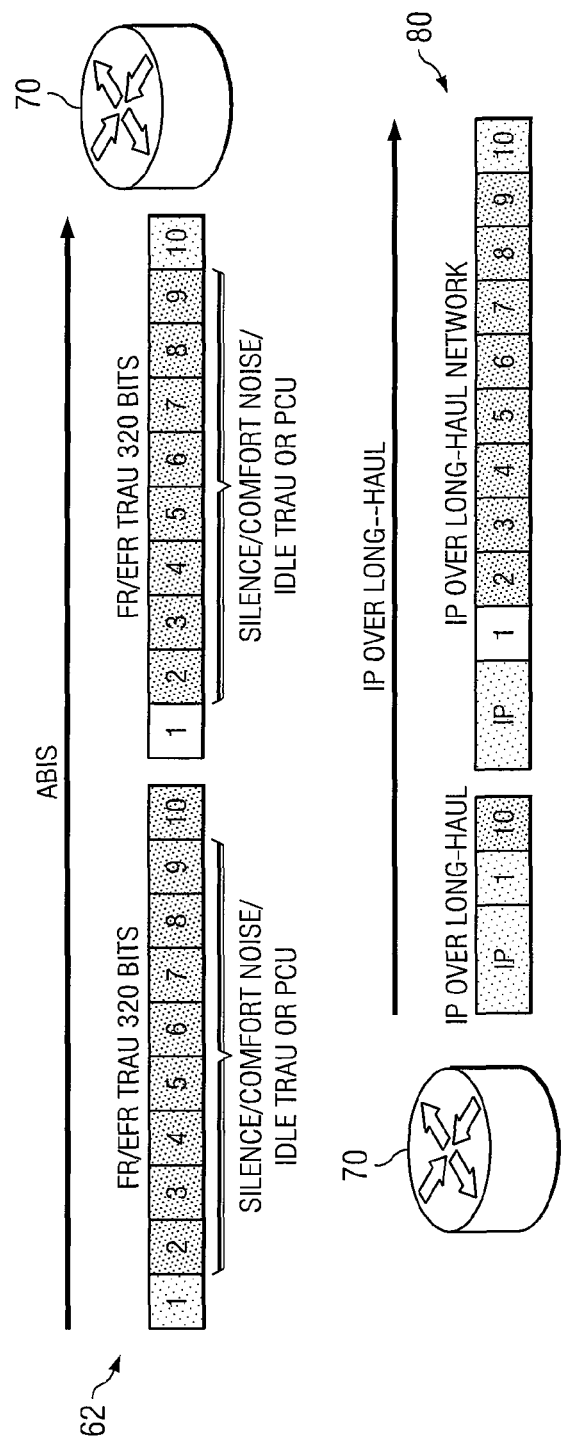

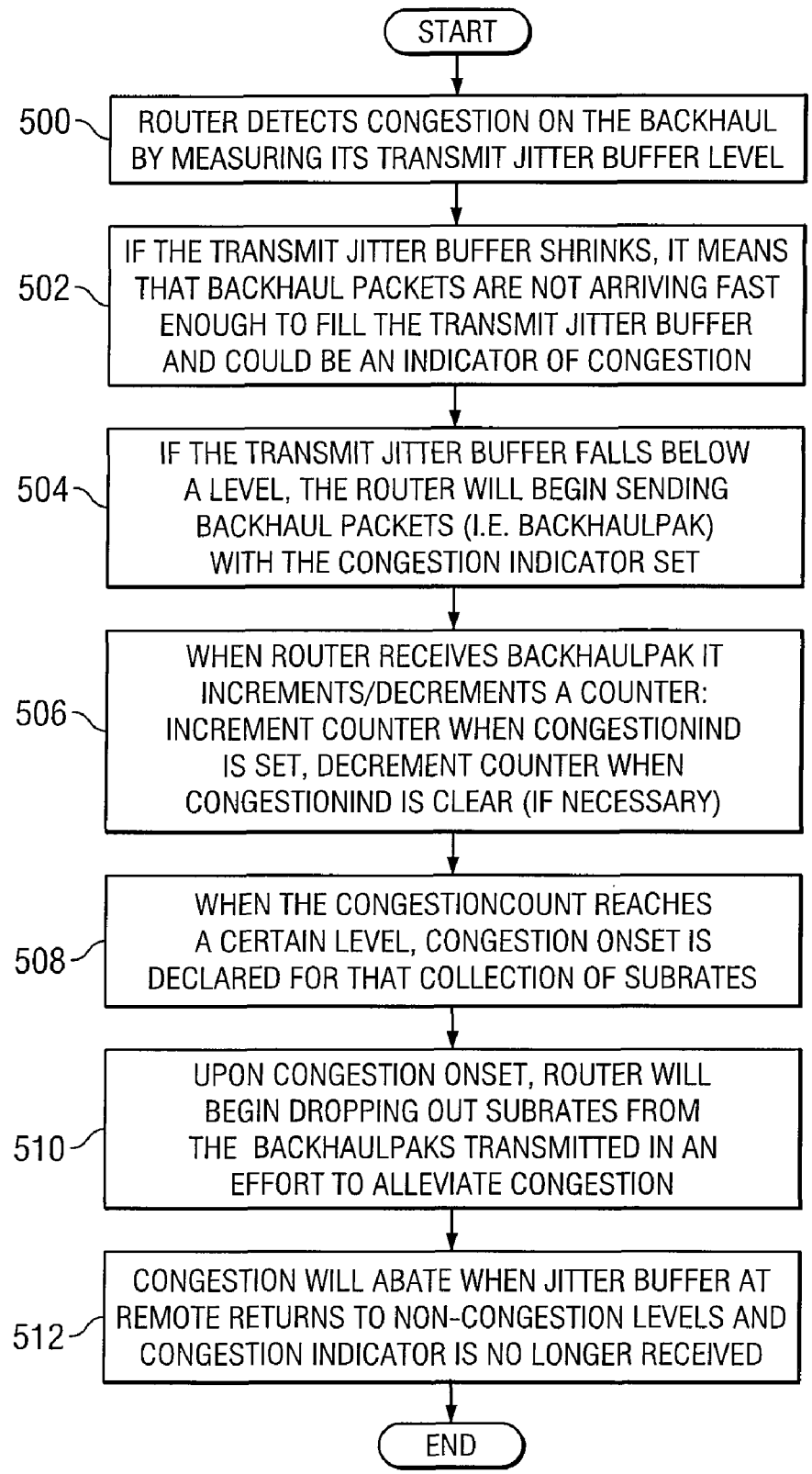

FIG. 6A

```
START
  t=0ms <--rxGSM-Interrupt (xmit_jitterBufSz=2)
      xmit_jitterBufSz > 1 --> no congestion
      send backhaul with congestionInd=0
      -->txGSM (xmit_jitterBufSz=1)

--> rxBackhaul (xmit_jitterBufSz=1) --> fill jitterBuf t=2ms <--rxGSM-Interrupt (xmit_jitterBufSz=2)
      xmit_jitterBufSz > 1 --> no congestion
      send backhaul with congestionInd=0
      -->txGSM (xmit_jitterBufSz=1)

*** missed rxBackhaul (xmit_jitterBufSz=1)

t=4ms <--rxGSM-Interrupt (xmit_jitterBufSz=1)
      xmit_jitterBufSz == 1 --> could be congestion, notify remote
      send backhaul with congestionInd=1
      -->txGSM (xmit_jitterBufSz=0)

--> rxBackhaul (xmit_jitterBufSz=0) --> fill jitterBuf t=6ms <--rxGSM-Interrupt (xmit_jitterBufSz=1)
      xmit_jitterBufSz == 1 --> could be congestion, notify remote
      send backhaul with congestionInd=1
      -->txGSM (xmit_jitterBufSz=0)

*** we're okay if we receive the late + on-time backhaulPaks

--> rxBackhaul (xmit_jitterBufSz=0) --> fill jitterBuf
      --> rxBackhaul (xmit_jitterBufSz=1) --> fill jitterBuf t=8ms <--rxGSM-Interrupt (xmit_jitterBufSz=2)
      xmit_jitterBufSz > 1 --> no congestion
      send backhaul with congestionInd=0
      -->txGSM (xmit_jitterBufSz=1)

--> rxBackhaul (xmit_jitterBufSz=1) --> fill jitterBuf t=10ms <--rxGSM-Interrupt (xmit_jitterBufSz=2)
      xmit_jitterBufSz > 1 --> no congestion
      send backhaul with congestionInd=0
      -->txGSM (xmit_jitterBufSz=1)
END
```

```
START
  t=0ms --> rxBackhaul w/congestionInd=1
       congestion_status = ABATE
         <increment>
congestion_onset_counter=47 t=2ms --> rxBackhaul w/congestionInd=1
       congestion_status = ABATE
         <increment>
congestion_onset_counter=48 t=4ms --> rxBackhaul w/congestionInd=1
       congestion_status = ABATE
         <increment>
congestion_onset_counter=49 t=6ms --> rxBackhaul w/congestionInd=1
       congestion_status = ABATE
         <increment>
congestion_onset_counter=50
       rx_congestionInd_counter > 50,
declare congestion ONSET
       congestion_status = ABATE->ONSET t=8ms --> rxBackhaul w/congestionInd=1
       congestion_status = ONSET
         <no action>
congestion_abate_counter=0 t=10ms --> rxBackhaul w/congestionInd=1
       congestion_status = ONSET
         <no action>
congestion_abate_counter=0 t=12ms --> rxBackhaul w/congestionInd=0
       congestion_status = ONSET
         <increment>
congestion_abate_counter=1 t=14ms --> rxBackhaul w/congestionInd=0
       congestion_status = ONSET
         <increment>
congestion_abate_counter=2
  .
  .
  .
  t=512ms --> rxBackhaul w/congestionInd=0
       congestion_status = ONSET
         <increment>
congestion_abate_counter=251
       congestion_abate_counter > 251,
declare congestion ABATE
       congestion_status = ONSET->ABATE

END
```

*FIG. 6C*

```
START
  t=0ms --> rxBackhaul w/congestionInd=0
       congestion_status = ABATE
         <no action>
congestion_onset_counter=0 t=2ms --> rxBackhaul w/congestionInd=0
       congestion_status = ABATE
         <no action>
congestion_onset_counter=0 t=4ms --> rxBackhaul w/congestionInd=1
       congestion_status = ABATE
         <increment>
congestion_onset_counter=1 t=6ms --> rxBackhaul w/congestionInd=1
       congestion_status = ABATE
         <increment>
congestion_onset_counter=2 t=8ms --> rxBackhaul w/congestionInd=0
       congestion_status = ABATE
         <decrement>
congestion_onset_counter=1 t=10ms --> rxBackhaul w/congestionInd=0
       congestion_status = ABATE
         <decrement>
congestion_onset_counter=0

END
```

*FIG. 6B*

SYSTEM AND METHOD FOR DETECTING AND REGULATING CONGESTION IN A COMMUNICATIONS ENVIRONMENT

TECHNICAL FIELD OF THE INVENTION

The present invention relates in general to the field of communications and, more particularly, to a system and a method for detecting and regulating congestion in a communications environment.

BACKGROUND OF THE INVENTION

Communication systems and architectures have become increasingly important in today's society. One aspect of communications relates to maximizing bandwidth and minimizing delays associated with data and information exchanges. Many architectures for effectuating proper data exchanges can add significant overhead and cost in order to accommodate a large number of end-users or data streams. For example, a large number of T1/E1 lines may be implemented to accommodate heavy traffic, but such lines are generally expensive and, thus, usage of each one should be maximized (to the extent that it is possible) in order to achieve a system benefit per-unit of cost.

Compression techniques can be used by network operators to produce high percentages of bandwidth savings. In certain scenarios, network operators may consider compressing common communication patterns that appear on a given communication link. However, many of the existing compression/suppression protocols are deficient because they are static, unresponsive, and rigid. Moreover, many such systems add overhead to the system, while not yielding a sufficient offsetting bandwidth gain. Additionally, current architectures fail to detect and adequately respond to congestion problems. Accordingly, the ability to provide a communications system that consumes few resources, optimizes bandwidth, and offers an ideal congestion response mechanism presents a significant challenge for network operators, service providers, and system administrators.

SUMMARY OF THE INVENTION

From the foregoing, it may be appreciated by those skilled in the art that a need has arisen for an improved detection and regulation approach for addressing congestion on backhaul communications links. In accordance with one embodiment of the present invention, a system and a method for providing protocols for detecting and regulating congestion are provided that substantially eliminate or greatly reduce disadvantages and problems associated with conventional communication techniques.

According to one embodiment of the present invention, an apparatus for communicating data is provided that includes a cell site element associated with a base transceiver station and operable to receive a plurality of packets associated with a communications flow, the packets including a plurality of subrates. The cell site element is further operable to detect a congestion condition via a measurement of a level in a receive jitter buffer. When the congestion condition exists, individual subrates can be dropped from subsequent backhaul packets until congestion subsides.

In more particular embodiments, the cell site element can be informed that congestion exists, whereby a congestion level is assigned to a set (i.e. a collection) of respective subrates. In addition, the cell site element prioritizes the subrates and removes individual samples from one or more of the packets; high priority calls and critical radio control information are not affected during the congestion condition.

Certain embodiments of the present invention may provide a number of technical advantages. For example, according to one embodiment of the present invention, a communications approach is provided that enhances bandwidth parameters for a given architecture. This is a result of the detection and regulation scheme being employed. One aspect of the present invention can detect congestion by measuring levels in the receive jitter buffer. Subsequently, the sender can be informed that congestion exists. When congestion exists, individual subrates can be dropped from subsequent backhaul packets until congestion subsides. This protocol is advantageous due to its ability to avoid dropping an entire packet. A congestion level is assigned to a collection (i.e. a set) of subrates. When congestion exceeds the level associated with a collection of subrates, only the selected individual subrates are dropped.

Additionally, the present invention can detect congestion at the remote end when packets arrive late. Late arriving packets are an indication that congestion is occurring at any intermediate node, not just the sending or receiving node. This allows the present invention to work in scenarios where the backhaul network contains multiple hops.

Certain embodiments of the present invention may enjoy some, all, or none of these advantages. Other technical advantages may be readily apparent to one skilled in the art from the following figures, description, and claims.

BRIEF DESCRIPTION OF THE DRAWINGS

For a more complete understanding of the present invention and the advantages thereof, reference is made to the following description taken in conjunction with the accompanying drawings, wherein like reference numerals represent like parts, in which:

FIGS. 2A-2B are block diagrams of an example internal structure associated with either a cell site element or an aggregation node of the communication system;

FIG. 4 is a simplified schematic diagram of an example associated with the communication system;

FIG. 5 is a simplified flowchart illustrating an example operation associated with one embodiment of the present invention; and FIGS. 6A-6C are example flow schemes for detection and regulation scenarios associated with the present invention.

DETAILED DESCRIPTION OF THE INVENTION

Figure 1:
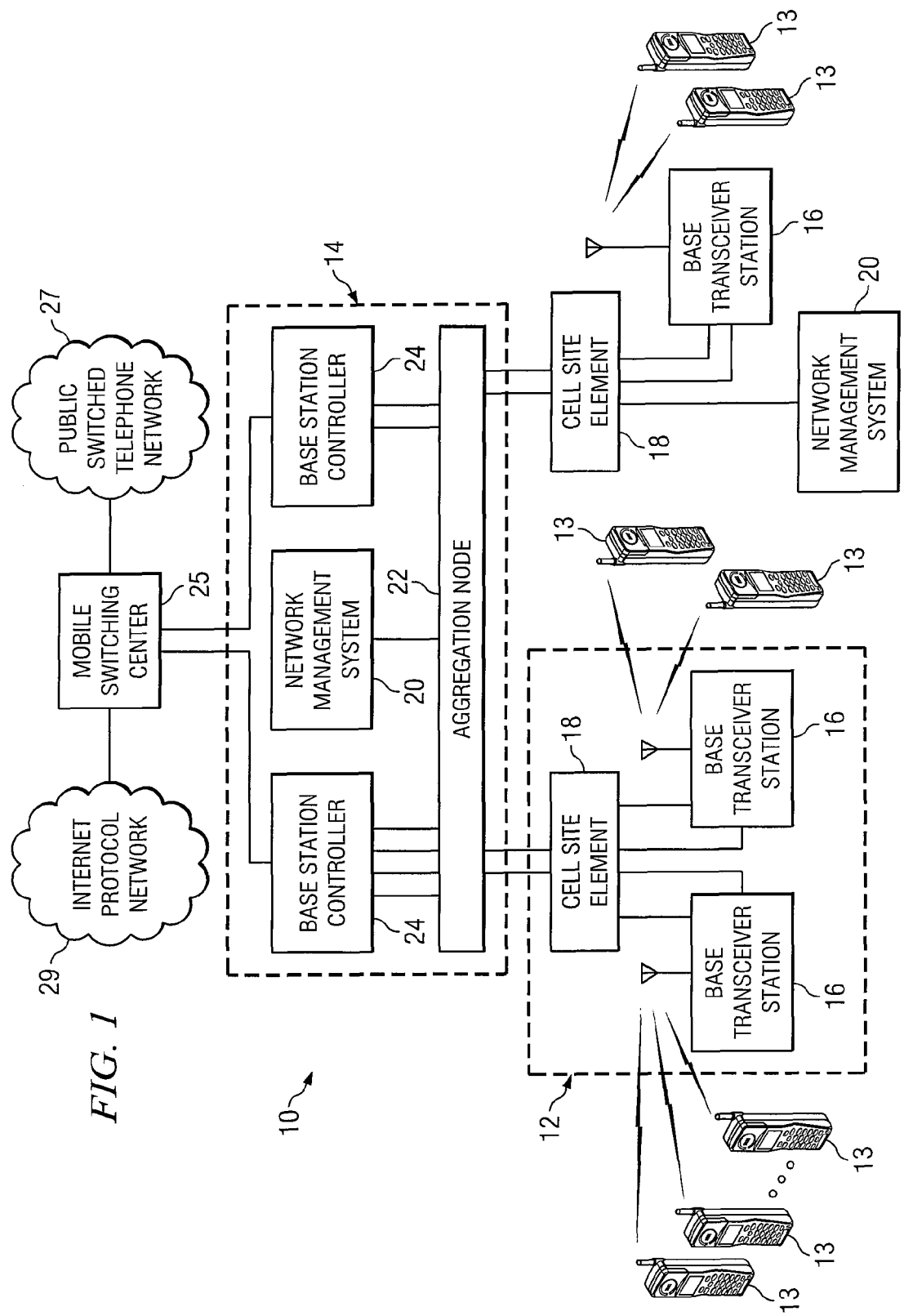
FIG. 1 is a simplified block diagram of a communication system for dynamically suppressing data in a network environment.

FIG. 1 is a simplified block diagram of a communication system 10 that operates to detect and to regulate congestion for a communications environment. Communication system 10 may also compress or suppress data, as outlined below. In a general sense, there are multiple operational aspects of the present invention. Some of these functional capabilities may be integrated into a singular solution or these ideas may be implemented in distinct embodiments.

Communication system 10 may include a plurality of cell sites 12, a plurality of mobile stations 13, a central office site 14, a plurality of base transceiver stations 16, a plurality of cell site elements 18, and a network management system 20. Additionally, communication system 10 may include an aggregation node 22, a plurality of base station controllers 24, a mobile switching center 25, a public switched telephone network (PSTN) 27, and an Internet protocol (IP) network 29. Note the communications links extending between cell site element 18 and aggregation node 22, as compared to the number of communication links extending between cell site element 18 and base transceiver stations 16. This arrangement has been provided in order to illustrate that without the present invention, the number of communication links between cell site 12 and central office site 14 would be equal to the output of base transceiver stations 16. By implementing the suppression techniques of the present invention (and as explained in detail below), a reduction in communication links between cell site 12 and central office site 14 is achieved.

Communication system 10 may generally be configured or arranged to represent 2.5G architecture applicable to a Global System for Mobile (GSM) environment in accordance with a particular embodiment of the present invention. However, the 2.5G architecture is offered for purposes of example only and may alternatively be substituted with any suitable networking system or arrangement that provides a communicative platform for communication system 10. For example, the present invention may be used in conjunction with data communications, such as those that relate to packet data transmissions. Additionally, communication system 10 may be provided in a 3G network, where 3G equivalent networking equipment is provided in the architecture. Communication system 10 is versatile in that it may be used in a host of communications environments such as in conjunction with any time division multiple access (TDMA) element or protocol for example, whereby signals from end-users, subscriber units, or mobile stations 13 may be multiplexed over the time domain.

As illustrated in FIG. 1, in a GSM network, a backhaul network exists between a BTS and a BSC. The backhaul can be used to transmit voice conversations, data, and control information using various standards and proprietary vendor specific formats. In order to address operational expenses, a backhaul optimization scheme is desired that will provide significant bandwidth savings, while maintaining low latency and end-to-end transmissions for all possible frame types.

In accordance with the teachings of one aspect of the present invention, communication system 10 operates to suppress unused, idle, and redundant information in offering an optimal solution for the backhaul network. This can be achieved by dynamically detecting and suppressing repeating bit patterns embedded in subsequent 8 Kbps sub-rate frames and then recreating the suppressed data at the far end of the communications link. These operations can be performed regardless of the frame format and the sub-rate width being employed at any given time. Thus, an incoming bit pattern may be evaluated to determine whether it can be suppressed. A bit pattern can be played out or restored on the opposite end of the communication link to mimic the data in cases where the frame is designated for suppression. The restoration function includes suitable ordering and timing operations. This recognition (of prevalent repeating streams) would allow the greatest savings for any compression operation. In cases where the incoming pattern is not a candidate for suppression (i.e. not repetitious), the entire bit pattern could then be sent, as the architecture would be unable to suppress all of the diverse bit patterns in a given backhaul with fewer bits. A demultiplexer, which is positioned downstream, may then simply perform a series of reverse operations in identifying the suppressed information and playing out the data.

Preprocessing of the input bits can be done such that the samples being considered for suppression are not necessarily consecutive bits from the input stream, but can be selected such that they are most likely to be suppressible. Hence, the present invention provides for the reordering of input bits, the selection of samples from the reordered bit stream, and the restoration of proper bit ordering.

Using such a protocol, communication system 10 provides a simplistic solution for reducing compression and decompression operations. In addition to creating minimal overhead and being easy to implement (with potential modifications only being made to aggregation node 22 and cell site element 18), such an approach could cooperate with any suitable compression protocol or arrangement. The enhancement in transmission can be provided in both aggregation node 22 and cell site element 18, as the present invention bi-directional.

In order to reduce operational expenditures, the above-identified solution can be implemented or deployed. As outlined herein, this backhaul optimization scheme provides significant bandwidth savings, while maintaining low latency end-to-end transmissions for all possible frame types. Because of the backhaul savings that can be achieved using this scheme, it is possible for network operators to aggregate multiple circuit switched backhaul links into a lesser number of packet switched backhaul links. Because of this aggregation, it is possible that network operators will over-subscribe the backhaul links during periods of high utilization. When this over-subscription occurs, it is desirable to offer a method that will pro-actively drop some calls but protect critical timeslots, such as timeslots that contain control information.

The IP RAN suppression technology outlined herein can cooperate with a second aspect of the present invention in order to provide a detection and regulation protocol for congestion on the backhaul. In order to understand the uniqueness of the detection/regulation aspect of the present invention, it is necessary to have an understanding of the underlying suppression solution and, hence, both concepts are disclosed in their entirety herein. A key concept of the underlying suppression approach is that backhaul packets consist primarily of multiplexed voice samples. Each 16 Kbps sample contains 32 bits. A typical 16 Kbps GSM voice packet is 320 bits. Therefore, a typical 16 Kbps GSM voice packet spans 10 GSM backhaul packets.

Rather than drop one or more complete packets under congestion conditions, the present invention prioritizes and removes individual samples from the backhaul packet. This reduces the size of the backhaul packet (as necessary) to alleviate congestion but this does not affect all calls. Therefore, high priority calls and critical radio control information are not affected during periods of excessive congestion. In addition, because of the unique nature of the underlying suppression approach, dropped samples will have a minimal effect on calls when the duration of the congestion is short.

There are certain congestion control algorithms that can operate on entire packets. One example of this is the congestion onset/abatement algorithm that is used by SS7 MTP3 layer packets. This operates by assigning congestion levels to each MTP3 packet. When congestion reaches a certain level, all packets assigned to that level or below are dropped, allowing higher-level "critical" packets to get through. Since MTP3 control message operate on a node-by-node basis, congestion is easily detected by calculating the local queue depth.

The present invention can detect congestion by measuring levels in the receive jitter buffer. Subsequently, the sender can be informed that congestion exists. When congestion exists, individual subrates are dropped from subsequent backhaul packets until congestion subsides. Such a protocol offers a number of significant advantages, one of which relates to the ability to avoid dropping an entire packet. A congestion level is assigned to a collection of subrates. When congestion exceeds the level associated with the collection of subrates, only individual subrates are dropped.

Additionally, the present invention can detect congestion at the remote end when packets arrive late. Late arriving packets are an indication that congestion is occurring at any intermediate node, not just the sending or receiving node. This allows the invention to work when the backhaul network contains multiple hops. Detailed example flows for these detection and regulation operations are provided below with reference to FIGS. 5 and 6A-6C.

Note that for purposes of teaching and discussion, it is useful to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

It can be appreciated that circuit switched data is generally present on the backhaul and the challenge is to convert that into packet switched data such that additional IP traffic can be added to this data. This could maximize the bandwidth available on the backhaul. From another perspective, the bandwidth required to support the circuit switched data should be reduced where possible.

A number of time slots (e.g. within a T1/E1) are often idle or unused. Other patterns may include repetitive voice data, silence data, user data, or control data. Recognizing this inefficiency allows some of this idleness to be eliminated, as the only information that should be propagating along the backhaul is information that is unique (i.e. cannot be recreated at aggregation node 22). Other insignificant data segments (e.g. silence, certain control information, etc.) can similarly be accounted for and eliminated from the traffic flows to produce an increase in available bandwidth. The following are candidates for suppression (i.e. not transmitted over a given IP E1 from BTS site to BSC site): 1) idle/unallocated time slots; 2) idle TRAU; 3) silence TRAU; 4) error sub-rate/channel; 5) HDLC idle (repeating 7E flags); and 6) GPRS idle/repeating PCU/CCU.

Hence, by removing much of the overhead, a new frame (or super-frame) can be built that is much smaller. The new frame can be packetized and then sent across the backhaul. This would achieve a reduction in bandwidth required to communicate information from one location to another and/or reduce the number of E1/T1 lines between base transceiver station 16 and base station controller 24.

Mobile station 13 may be used to initiate a communication session that may benefit from such a suppression protocol. Mobile station 13 may be an entity, such as a client, subscriber, end-user, or customer that seeks to initiate a data flow or exchange in communication system 10 via any suitable network. Mobile station 13 may operate to use any suitable device for communications in communication system 10. Mobile station 13 may further represent a communications interface for an end-user of communication system 10. Mobile station 13 may be a cellular or other wireless telephone, an electronic notebook, a computer, a personal digital assistant (PDA), or any other device, component, or object capable of initiating a data exchange facilitated by communication system 10. Mobile station 13 may also be inclusive of any suitable interface to the human user or to a computer, such as a display, microphone, keyboard, or other terminal equipment (such as for example an interface to a personal computer or to a facsimile machine in cases where mobile station 13 is used as a modem). Mobile station 13 may alternatively be any device or object that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

Base transceiver stations 16 are communicative interfaces that may comprise radio transmission/reception devices, components, or objects, and antennas. Base transceiver stations 16 may be coupled to any communications device or element, such as mobile station 13 for example. Base transceiver stations 16 may also be coupled to base station controllers 24 (via one or more intermediate elements) that use a landline (such as a T1/E1 line, for example) interface. Base transceiver stations 16 may operate as a series of complex radio modems where appropriate. Base transceiver stations 16 may also perform transcoding and rate adaptation functions in accordance with particular needs. Transcoding and rate adaptation may also be executed in a GSM environment in suitable hardware or software (for example in a transcoding and rate adaptation unit (TRAU)) positioned between mobile switching center 25 and base station controllers 24.

In operation, communication system 10 may include multiple cell sites 12 that communicate with mobile stations 13 using base transceiver stations 16 and cell site element 18. Central office site 14 may use aggregation node 22 and base station controllers 24 for communicating with cell site 12. One or more network management systems 20 may be coupled to either cell site 12 and central office site 14 (or both as desired), whereby mobile switching center 25 provides an interface between base station controllers 24 (of central office site 14) and PSTN 27, IP network 29, and/or any other suitable communication network. Base transceiver stations 16 may be coupled to cell site element 18 by a T1/E1 line or any other suitable communication link or element operable to facilitate data exchanges. A backhaul connection between cell site element 18 and aggregation node 22 may also include a T1/E1 line or any suitable communication link where appropriate and in accordance with particular needs.

Base station controllers 24 generally operate as management components for a radio interface. This may be done through remote commands to a corresponding base transceiver station within a mobile network. One base station controller 24 may manage more than one base transceiver stations 16. Some of the responsibilities of base station controllers 24 may include management of radio channels and assisting in handoff/handover scenarios.

In operation, various traffic protocols (e.g. time division multiplexed (TDM), GSM 8.60 Frame Relay, high level data link control (HDLC), asynchronous transfer mode (ATM), point to point protocol (PPP) over HDLC, TRAU, vendor-specific formats, etc.) may be used and communicated by each base transceiver station 16 to cell site element 18 of cell site 12. Cell site element 18 may also receive IP or Ethernet traffic from network management system 20. Cell site element 18 may multiplex together payloads from the layer-two based traffic that have a common destination. The multiplexed payloads, as well as any payloads extracted from the network management system IP or Ethernet traffic may be communicated across a link to aggregation node 22 within central office site 14. Aggregation node 22 may demultiplex the payloads for delivery to an appropriate base station controller 24 or network management system 20.

Mobile switching center 25 operates as an interface between PSTN 27 and base station controllers 24, and potentially between multiple other mobile switching centers in a network and base station controller 24. Mobile switching center 25 represents a location that generally houses communication switches and computers and ensures that its cell sites in a given geographical area are properly connected. Cell sites refer generally to the transmission and reception equipment or components that connect elements such as mobile station 13 to a network, such as IP network 29 for example. By controlling transmission power and radio frequencies, mobile switching center 25 may monitor the movement and the transfer of a wireless communication from one cell to another cell and from one frequency or channel to another frequency or channel. In a given communication environment, communication system 10 may include multiple mobile switching centers 25 that are operable to facilitate communications between base station controller 24 and PSTN 27. Mobile switching center 25 may also generally handle connection, tracking, status, billing information, and other user information for communications in a designated area.

PSTN 27 represents a worldwide telephone system that is operable to conduct communications. PSTN 27 may be any landline telephone network operable to facilitate communications between two entities, such as two persons, a person and a computer, two computers, or in any other environment in which data is exchanged for purposes of communication. According to one embodiment of the present invention, PSTN 27 operates in a wireless domain, facilitating data exchanges between mobile station 13 and any other suitable entity within or external to communication system 10.

IP network 29 is a series of points or nodes of interconnected communication paths for receiving and transmitting packets of information that propagate through communication system 10. IP network 29 offers a communications interface between mobile stations 13 and any other suitable network equipment. IP network 29 may be any local area network (LAN), metropolitan area network (MAN), wide area network (WAN), wireless local area network (WLAN), virtual private network (VPN), or any other appropriate architectural system that facilitates communications in a network environment. IP network 29 implements a transmission control protocol/Internet protocol (TCP/IP) communication language protocol in a particular embodiment of the present invention. However, IP network 29 may alternatively implement any other suitable communications protocol for transmitting and receiving data packets within communication system 10.

FIGS. 2A and 2B are simplified block diagrams of an example internal structure of cell site element 18 and aggregation node 22, both of which include a dynamic suppression element 60 and a detection and regulation element 68. In one embodiment, dynamic suppression element 60 is an algorithm (potentially included in appropriate software) that achieves the suppressing operations as described herein. Similarly, detection and regulation element 68 is an algorithm (potentially included in appropriate software) that achieves the detection and regulation operations as described herein. In other embodiments, these elements are combined or provided separately.

The functional flow of communication system 10 may follow a bits in/bits out protocol, being dependent only on the received bit pattern. Input DS0s may be demultiplexed to create an appropriate number of sub-rate DS0s, each corresponding to a different call. (Note that some DS0s are not assigned to any call and still others are used for control information.) For each sub-rate DS0, a certain portion (e.g. two milliseconds) of samples may be collected synchronously. Because the corresponding inputs are time-division multiplexed (TDM) streams, the collection operation should be completed at roughly the same time. For sixteen kilobits/sec multiplexing, this results in a collection of four bytes of data from each stream at about the same time.

The collected samples may be compared to a few pre-identified (or previously learned) patterns (e.g. the previously occurring input streams) and decisions may be made regarding which bits are to be suppressed with a corresponding header representing that the data has been suppressed. The receiving end may then perform reverse operations in accounting for the suppression in order to restore the bit stream and, potentially, to then communicate it to its intended next destination. Thus, a demultiplexer/decompressor (not shown) may perform tasks in reverse in order to undo what was done by the compressor and the multiplexer, which can be included within aggregation node 22 and/or cell site element 18.

TDM streams may be TDM multiplexed to generate appropriate DS0s, which are further combined with drop-and-insert DS0s to create T1/E1s. Based on the header of the overall multiplexed packet, appropriate line conditions or alarms may be generated at the output T1/E1 interface. Note that in order to increase robustness in the presence of errors, it is possible to protect payload header bits by a forward error correcting code and dropping the cyclic redundancy check (CRC) from point to point protocol (PPP) frames. An example of a simple error correcting method could be a table-based parity method, which can correct all one-bit errors.

It is critical to note that dynamic suppression element 60 may be changed considerably, as it offers only one example suppression protocol configuration that accommodates any of the identified incoming bit patterns. Any number of alternative bit patterns may be readily accommodated by communication system 10 and are, therefore, included in the broad scope of its teachings. These common patterns may be based on particular communication needs or on the prevalence of commonly reoccurring bit patterns in a given communications architecture. Additionally, any attached header bits may also provide E1/T1 line conditions and alarms. In other embodiments, additional bits may be added to the header bits in order to provide any number of functions, such as control parameters, the state of the given communication link, the condition of the E1/T1 line, the condition of an alarm, or the identification of a certain packet. Thus, these extra bits may provide any suitable additional information that may be relevant to a communication session occurring in communication system 10. Additionally, dynamic suppression element 60 can be used to transport any TDM stream over IP. For example, some applications use TDMA and GSM on the same E1 (i.e. TDM on some timeslots, GSM on others). The present invention transports all such information over IP and restores the bit stream on the far end of TDM E1. For some TDMA applications, there is not a lot of suppression occurring, but the system is still functional.

Figure 3:
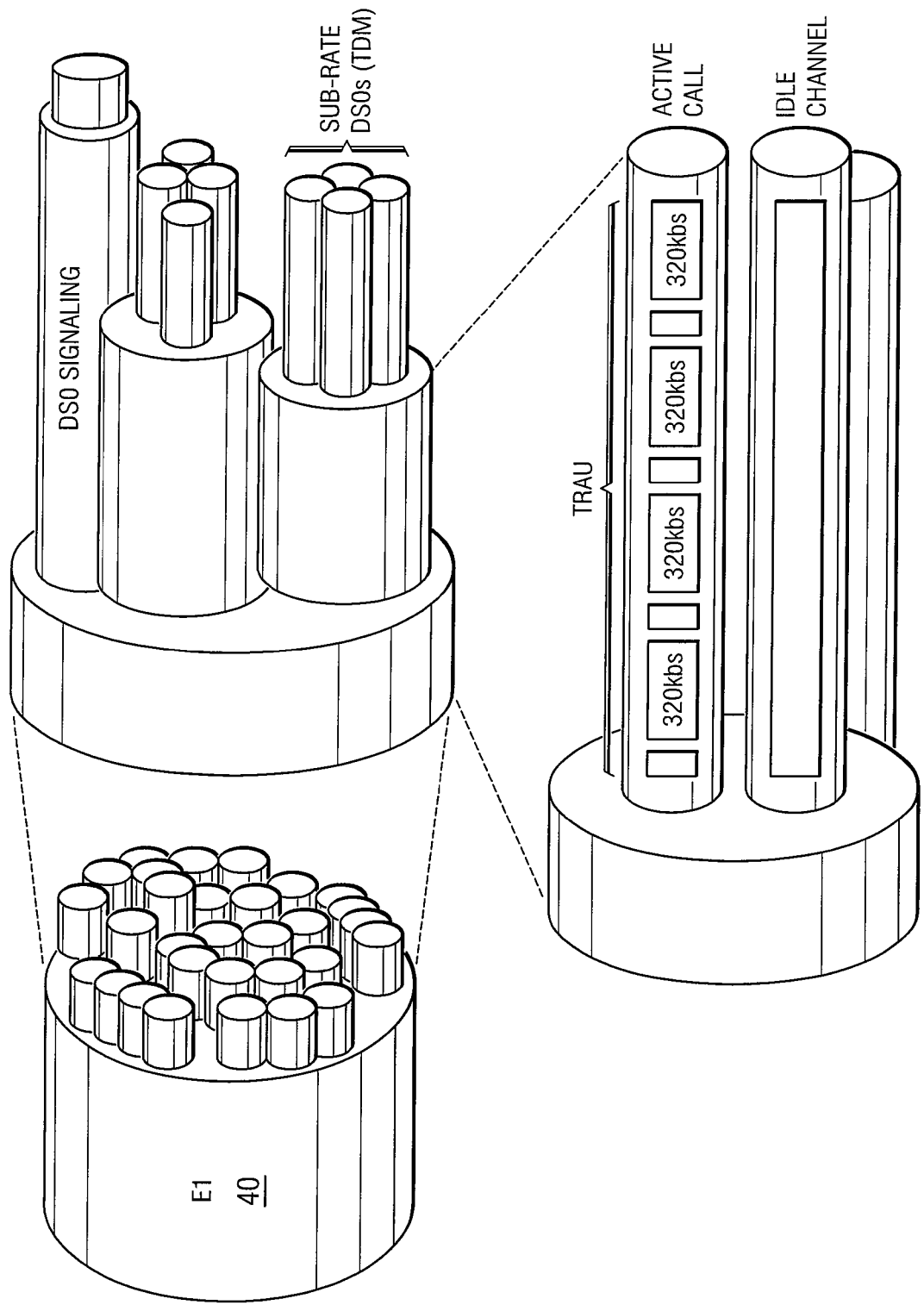
FIG. 3 is a simplified schematic diagram of an example GSM 8.60 format.

Before turning to FIG. 3, it is critical to note that the use of the terms 'aggregation node' and 'cell site element' herein in this document only connotes an example representation of one or more elements associated with base transceiver station 16 and base station controller 24. These terms have been offered for purposes of example and teaching only and do not necessarily imply any particular architecture or configuration. Moreover, the terms 'cell site element' and 'aggregation node' are intended to encompass any network element that is operable to facilitate a data exchange in a network environment. Accordingly, cell site element 18 and aggregation node 22 may be routers, switches, bridges, gateways, interfaces, or any other suitable module, device, component, element or object operable to effectuate one or more of the operations, tasks, or functionalities associated with compressing data as implied, described, or offered herein.

As identified above, each of these components may include software and/or an algorithm to effectuate suppression for voice or packet data applications (specifically through dynamic suppression element 60) and/or to execute the detection and regulation operations (specifically through detection and regulation element 68) as described herein. Alternatively, such operations and techniques may be achieved by any suitable hardware, component, device, application specific integrated circuit (ASIC), additional software, field programmable gate array (FPGA), processor, algorithm, erasable programmable ROM (EPROM), electrically erasable programmable ROM (EEPROM), or any other suitable object that is operable to facilitate such operations. Considerable flexibility is provided by the structure of cell site element 18 and aggregation node 22 in the context of communication system 10. Thus, it can be easily appreciated that such functions could be provided external to cell site element 18 and aggregation node 22 or combined where appropriate. In such cases, such a functionality could be readily embodied in a separate component, device, or module.

FIG. 3 is simplified block diagram of an example GSM 8.60 format E1 structure. In operation of an example embodiment, consider a case where an end user is having a conversation using a mobile station. Voice frames from a given mobile station are generally being generated every 20 milliseconds in such a scenario. In a typical environment, there are 320-bit frames that are sent directly behind each other. In a native environment, base transceiver station 16 receives this information and converts it into TRAU frames. There is control information that is exchanged (on another channel) between base transceiver station 16 and base station controller 24 (over an E1 link 40) that indicates which channel or which sub-rate that will be assigned for this call.

When a call comes up, these frames (which are primarily of a fixed length) are put into T1/E1 sub-rates, whereby a DS0 is eight bits. These eight bits can be further divided into sub-rates (an 8 kilobit sub-rate corresponds to a single bit, a 16 kilobit sub-rate corresponds to two bits, a 32 kilobit sub-rate corresponds to four bits, and a 64 kilobit sub-rate corresponds to the full DS0).

In a simple case, a call is on a 16 kilobit sub-rate channel and it will be assigned to a time slot (and assigned one sub-rate inside that time slot) for transmission over the E1. Every 125 microseconds, two bits of the frame are being sent across the E1. Base station controller 24 receives this information, assembles the frames, and then presents them to the TRAU.

In accordance with the operation of the present invention, the framing protocol that is used (e.g. 16 kilobit TRAU frames, half-rate calls, etc.) is ignored. The algorithm of the present invention will universally divide the channel into 8-kilobit sub-rates. In this manner, synchronization is not being attempted; only the raw bits are being evaluated. The algorithm can begin to collect bits on an 8-kilobit sub-rate basis. For example, if a full E1 is present, then 31 time slots (each time slot having 8 sub-rates) are present that could have data. Hence, a total of 248 eight-kilobit sub-rates could be active.

In this example embodiment, an FPGA could be employed to monitor the line and to separate the bits into 248 sub-rates. The FPGA can also collect a sample that contains 16 bits for each sub-rate (every two milliseconds). The FPGA can also perform demultiplexing operations. After the two-millisecond interval elapses, the FPGA then has 16 bits collected for each sub-rate. The FPGA can then send an interrupt signal to IOS with this new packet (i.e. the super-frame) that has information for each of the sub-rates. From IOS, there will be 3968 bits (plus header bits), which consists of 248 samples of 16 bits each.

Over a period of ten samples, that data would add up to approximately a frames worth of data. Recall that the frames are of a fixed length (e.g. 160 bits). The algorithm can now take these and forward them to the other end (i.e. the base station controller) such that they can be demultiplexed and regenerated. Coupled to this super-frame is a header, which can be a bit-mask (where there is one bit for each possible 16-bit sample). It should be noted that the bit mask is not always necessary (i.e. not included in the backhaul frame header). In order to compress the data, the IOS records and saves ten samples (in a row) and then compares the sample that is currently being evaluated with a sample that occurred ten samples ago. Stated differently, the algorithm compares the sample that it received for that sub-rate to the same sample that it received ten instances ago. Thus, the algorithm compares new bits to similar bits that would have been provided in the same bit position in a previous frame. The present invention capitalizes on the intrinsic nature of the data and the inherent characteristics of the fixed length restrictions.

The suppression changes dynamically based on the data that is being communicated. In addition, protocols such as HDLC can be significantly optimized such that flags will synchronize or line-up such that they are compressed out. Similarly, idle frames (or idle periods between frames) or silence will readily be compressed.

FIG. 4 is a simplified block diagram of an example that illustrates some of the concepts that have been discussed above. It should be emphasized that such an illustration is only a logical view of the present invention. Specifically, a single TRAU frame is generally not sent in the same IP backhaul packet, as FIG. 4 suggests. FIG. 4 has only been offered for purposes of teaching and discussion. Indicated generally at 62 are two TRAU frames being received by a router 70 (or a switch, a gateway, etc.), which is located on the base station controller side of the network. These represent the standard 320-bit frames that are coming into the system. Within the frames are the samples that were described previously. The first of these TRAU frames that is being received by router 70 is indicative of the whole sample, which should be sent unchanged (as it is the first sample).

This first sample is stored by router 70 and then the second of these TRAU frames is received by router 70. Now two samples can be compared (i.e. samples from one frame can be compared to samples from a previous frame). In this example, samples 2-9 are the same and, hence, do not have to be transmitted on the backhaul. An IP over long-haul element 80 is provided that illustrates how the data is actually transmitted across the backhaul. As identified earlier, the first TRAU frame is still transmitted over the backhaul. However, the second TRAU frame is handled differently, as the algorithm of the present invention can readily identify this opportunity for suppression/compression. In the second packet that is being sent samples 2-9 are not included. Only samples 1 and 10 are being sent in the second packet because only those samples are different between the two packets.

Hence, when samples between two frames are different, then the samples are included in the packet and sent across the backhaul. When samples are the same, then there is no need to send them over the backhaul. The repeating samples only need to be played back and not transmitted over the backhaul. Stated in anther way, only the "deltas" are transmitted over the backhaul. The delta reflects the difference in a comparison of the bits that would be in the same position of the previous frame.

Turning to FIG. 5, FIG. 5 offers an example operational flow for the detection and regulation aspect of the present invention. The method of FIG. 5 includes two perspectives: 1) from the viewpoint of the local router, which detects congestion via monitoring the transmit jitter buffer [steps 500, 502, and 504]; and 2) from the viewpoint of the remote router, which detects congestion via receipt of backhaulPaks indicating congestion detected at its peer [steps 506, 508, 510].

The method begins at step 500, where cell site element 18 (which in this example case is implemented in a router) detects congestion on the backhaul by measuring its transmit jitter buffer level. At step 502, if the transmit jitter buffer shrinks, it means that backhaul packets are not arriving fast enough to fill the transmit jitter buffer and could be an indicator of congestion.

At step 504, if the transmit jitter buffer falls below a given level, the router will begin sending backhaul packets (e.g. backhaulPak) with the congestion indicator set. At step 506, when the router receives the backhaulPak it increments/decrements a counter [increment counter when congestionInd is set and decrement counter when congestionInd is clear (if necessary)].

At step 508, when the congestionCount reaches a certain level, congestion onset is declared for that group of subrates. Upon congestion onset, the router will begin dropping out subrates from the backhaulPaks transmitted in an effort to alleviate congestion. This is reflected by step 510. At step 512, the congestion will abate when the jitter buffer at the remote end returns to non-congestion levels and the congestion indicator is no longer received. It is critical to note that any identification of certain flags or packets that propagate along the backhaul is merely being provided by way of example. Any other packet or flag could readily be used to achieve such operations. These items may be proprietary or conform to standards for IP RAN and equivalent technologies.

FIGS. 6A-6C illustrate example flows associated with detection and regulation activity on the backhaul. The first instance to be described addresses the general case of detecting congestion on the backhaul. In such a scenario, a local device detects congestion on the backhaul by measuring its transmit jitter buffer level. If the transmit jitter buffer shrinks, it means that backhaul packets are not arriving fast enough to fill the transmit jitter buffer and this could be an indicator of congestion. If the transmit jitter buffer falls below a level, the local device will begin sending backhaulPaks with the congestionInd set. For example, one level at which congestion could be declared is 50% of the configured transmit jitter buffer (default=4 ms→2 buffers). The corresponding flow, broken in 2 ms intervals, is provided by FIG. 6A.

The next scenario addresses receiving a congestion indicator on the backhaulPak. When the local device receives the backhaulPak, it increments/decrements a counter: increment counter when congestionInd is set and decrement counter when congestionInd is clear. When the congestion_onsetCount reaches a certain level, congestion onset is declared. For example, using the same example as provided in FIG. 6A, FIG. 6B illustrates the corresponding flow with 2 ms intervals.

The last scenario to be discussed addresses declaring congestion onset. As long as the transmit_jitterBufSz<50% configured transmit_jitterBufSz, the local device will send backhaul packets with the congestionInd set. If the transmit_jitterBuf expands past the defined level, the local will send backhaul packets with the congestionInd clear.

Now, at the remote device, that element keeps incrementing and/or decrementing its congestion_onset_counter: depending on what is received in the backhaulPak. If the counter is incremented beyond the ONSET level, congestion onset is declared and the device will begin dropping all non-critical timeslots from all future backhaul packets transmitted.

The current ONSET default level in this example is 100 ms (count=50), however all such parameters discussed in these flows of FIGS. 6A-6C could be varied considerably. The congestion_onset_counter increments such that when it reaches the ONSET level, congestion onset is declared; ABATE will not be declared until the congestion_abate_counter increments such that it reaches the ABATE level (default onset=50, default abate=250). An example of such a protocol is provided by FIG. 6C.

It can be appreciated that these counts are completely arbitrary and can be chosen by the network administrator based on the specific tolerance for congestion within the network. It should be noted that some of the steps discussed in the preceding FIGURES may be changed or deleted where appropriate and additional steps may also be added to the process flows. These changes may be based on specific communication system architectures or particular networking arrangements or configurations and do not depart from the scope or the teachings of the present invention.

Although the present invention has been described in detail with reference to particular embodiments illustrated in FIGS. 1 through 6C, it should be understood that various other changes, substitutions, and alterations may be made hereto without departing from the spirit and scope of the present invention. For example, although the present invention has been described with reference to a number of elements included within communication system 10, these elements may be rearranged or positioned in order to accommodate any suitable routing, compression, congestion detection/regulation, and suppression techniques. In addition, any of the described elements may be provided as separate external components to communication system 10 or to each other where appropriate. The present invention contemplates great flexibility in the arrangement of these elements as well as their internal components.

In addition, although the preceding description offers a suppression protocol and a congestion detection/regulation protocol to be implemented with particular devices (e.g., aggregation node 22 and cell site element 18), the compression/suppression protocol provided may be embodied in a fabricated module that is designed specifically for effectuating the techniques discussed above. Moreover, such a module may be compatible with any appropriate protocol, other than those discussed herein, which were offered for purposes of teaching and example only.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. An apparatus for communicating data, comprising:
a cell site element associated with a base transceiver station and operable to:
transmit a plurality of T1/E1 packets associated with a communications flow to a second cell site element, the T1/E1 packets including a plurality of subrates each corresponding to a priority; detect a congestion condition according to a congestion indicator, the congestion indicator indicating a measurement of a transmit buffer of the second cell site element falls below a level; continue to increment its congestion onset counter upon receiving a set congestion indicator from the second cell site element and to decrement its congestion onset counter upon receiving a clear congestion indicator from the second cell site element; and while the congestion condition exists, drop one or more individual subrates from subsequent T1/E1 packets according to the priority and transmit a portion of each subsequent T1/E1 packet comprising the remaining subrates.

2. The apparatus of claim 1, wherein the cell site element can be informed that congestion exists, whereby a congestion level is assigned to a collection of respective subrates.

3. The apparatus of claim 2, wherein as long as the transmit buffer of the second cell site element falls below the level, the cell site element receives from the second cell site element one or more packets with the congestion indicator set.

4. The apparatus of claim 3, wherein if the transmit buffer expands past the configured level, the cell site element receives from the second cell site element one or more packets with the congestion indicator clear.

5. The apparatus of claim 1, wherein if the counter is incremented beyond a configured congestion onset level, congestion onset is declared and the cell site element begins dropping all non-critical timeslots from all future packets to be transmitted.

6. The apparatus of claim 5, wherein the congestion onset counter increments such that when it reaches the configured congestion onset level, congestion onset is declared, whereby an abate condition will not be declared until a congestion abate counter increments such that it reaches a configured abate level.

7. The apparatus of claim 6, wherein the configured congestion onset level is about 50 counts and the configured abate level is 250 counts.

8. The apparatus of claim 2, further comprising:
an aggregation node associated with a base station controller, wherein the aggregation node serves as a remote peer device and is operable to communicate with the cell site element.

9. A method for communicating data, comprising:
transmitting a plurality of T1/E1 packets associated with a communications flow from a first cell site element to a second cell site element, the T1/E1 packets including a plurality of subrates each corresponding to a priority;
detecting a congestion condition according to a congestion indicator, the congestion indicator indicating a measurement of a transmit buffer of the second cell site element falls below a level; continuing to increment its congestion onset counter upon receiving the set congestion indicator from the second cell site element and to decrement its congestion onset counter upon receiving a clear congestion indicator from the second cell site element; and while the congestion condition exists, dropping one or more individual subrates from subsequent T1/E1 packets according to the priority and transmit a portion of each subsequent T1/E1 packet comprising the remaining subrates.

10. The method of claim 9, wherein a congestion level is assigned to a collection of the subrates.

11. The method of claim 9, wherein as long as a transmit buffer does not exceed a configured congestion onset level, one or more packets are received from the second cell site element with the congestion indicator set.

12. The method of claim 11, wherein if the transmit buffer expands past the configured congestion onset level, one or more packets are received from the second cell site element with the congestion indicator clear.

13. The method of claim 9, wherein if the counter is incremented beyond the configured congestion onset level, congestion onset is declared and non-critical timeslots are dropped from future packets to be transmitted.

14. The method of claim 13, wherein the congestion onset counter increments such that when it reaches the configured congestion onset level, congestion onset is declared, whereby an abate condition will not be declared until a congestion abate counter increments such that it reaches a configured abate level.

15. A computer readable medium comprising memory storing software for communicating data, the software when executed operable to: transmit a plurality of T1/E1 packets associated with a communications flow to a cell site element, the T1/E1 packets including a plurality of subrates each corresponding to a priority; detect a congestion condition according to a congestion indicator, the congestion indicator indicating a measurement of a transmit buffer of the cell site element falls below a level; increment or decrement its congestion onset counter depending on what is received in one or more of the congestion indicators; and while the congestion condition exists, drop one or more individual subrates from subsequent T1/E1 packets according to the priority and transmit a portion of each subsequent T1/E1 packet comprising the remaining subrates.

16. The computer readable medium of claim 15, wherein a congestion level is assigned to a collection of the subrates.

17. The computer readable medium of claim 15, wherein as long as a transmit buffer does not exceed a configured congestion onset level, one or more packets are received from the cell site element with the congestion indicator set.

18. The computer readable medium of claim 17, wherein if the transmit buffer expands past the configured congestion onset level, one or more packets are received from the cell site element with the congestion indicator clear.

19. The computer readable medium of claim 15, wherein if the counter is incremented beyond the configured congestion onset level, congestion onset is declared and non-critical timeslots are dropped from future packets to be transmitted.

20. The computer readable medium of claim 15, wherein the congestion onset counter increments such that when it reaches the configured congestion onset level, congestion onset is declared, whereby an abate condition will not be declared until a congestion abate counter increments such that it reaches a configured abate level.

* * * * *